(12) United States Patent
Kim et al.

(10) Patent No.: US 8,780,924 B2
(45) Date of Patent: Jul. 15, 2014

(54) GMPLS NON-ENABLED NETWORK GATEWAY AND OPERATING METHOD FOR ROUTING BETWEEN GMPLS ENABLED NETWORK AND GMPLS NON-ENABLED NETWORK

(75) Inventors: Sun Me Kim, Daejeon (KR); Ho Young Song, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 416 days.

(21) Appl. No.: 13/301,445

(22) Filed: Nov. 21, 2011

(65) Prior Publication Data

US 2012/0128003 A1    May 24, 2012

(30) Foreign Application Priority Data

Nov. 24, 2010  (KR) ................. 10-2010-0117375

(51) Int. Cl.
*H04L 12/28*    (2006.01)
*H04L 12/56*    (2006.01)

(52) U.S. Cl.
CPC ............. *H04L 45/50* (2013.01); *H04L 45/00* (2013.01); *H04L 47/724* (2013.01); *H04L 45/52* (2013.01)
USPC ................................................. 370/395.5

(58) Field of Classification Search
None
See application file for complete search history.

(56) References Cited

U.S. PATENT DOCUMENTS

2003/0210705 A1* 11/2003 Seddigh et al. ............... 370/419
2005/0105905 A1*  5/2005 Ovadia et al. .................. 398/47
2006/0126642 A1*  6/2006 Kojima et al. ........... 370/395.52

OTHER PUBLICATIONS

Caviglia, D. et al., "Requirements for the Conversion between Permanent Connections and Switched Connections in a Generalized Multiprotocol Label Switching (GMPLS) Network," Network Working Group (2009).
Caviglia, D. et al., "REVP-TE Signaling Extension for LSP Handover from the Management Plane to the Control Plane in a GMPLS-Enabled Transport Network," Internet Engineering Task Force (IETF) (2010).

* cited by examiner

*Primary Examiner* — Ian N Moore
*Assistant Examiner* — Brian T Le
(74) *Attorney, Agent, or Firm* — Nelson Mullins Riley & Scarborough LLP; Anthony A. Laurentano, Esq.; Lewis Lee, Esq.

(57) ABSTRACT

A generalized multiprotocol label switching (GMPLS) non-enabled network gateway for routing between a GMPLS enabled network and a GMPLS non-enabled network for connection between the GMPLS enabled network and the GMPLS non-enabled network, and an operating method for the GMPLS non-enabled network gateway are provided. The GMPLS non-enabled network gateway may include a border gateway protocol (BGP) routing unit to exchange routing information between a first GMPLS enabled network and a third GMPLS enabled network using a BGP, and a resource reservation protocol signaling unit to search for a path to another network using the routing information and to perform inter-autonomous system (AS) signaling by including a control plane of the first GMPLS enabled network or the third GMPLS enabled network and a signaling interface applying an out-of-band method.

9 Claims, 7 Drawing Sheets

GMPLS NON-ENABLED NETWORK GATEWAY AND OPERATING METHOD FOR ROUTING BETWEEN GMPLS ENABLED NETWORK AND GMPLS NON-ENABLED NETWORK

CROSS-REFERENCE TO RELATED APPLICATION

This application claims the benefit of Korean Patent Application No. 10-2010-0117375, filed on Nov. 24, 2010, in the Korean Intellectual Property Office, the disclosure of which is incorporated herein by reference.

BACKGROUND

1. Field of the Invention

The present invention relates to a generalized multiprotocol label switching (GMPLS) non-enabled network gateway for routing between a GMPLS enabled network and a GMPLS non-enabled network for connection between the GMPLS enabled network and the GMPLS non-enabled network, and an operating method for the GMPLS non-enabled network gateway.

2. Description of the Related Art

According to trends of network standardization, as inter-company service increases and global business expands, a demand for automatically setting a route among autonomous systems (AS) is increasing. Such a development in a network service necessarily supposes generalized multiprotocol label switching (GMPLS) protocol interconnection between the ASs.

However, for a communication provider not supporting the GMPLS, it may be difficult to cover expenses for upgrading all equipment necessary for adopting the GMPLS protocol in the AS. Also, advanced knowledge for managing the GMPLS technology is required.

Furthermore, when the GMPLS is not supported in the AS, interconnection in the GMPLS non-enabled network is impossible. In this case, real-time routing through an AS of the GMPLS non-enabled network may not be achieved. Also, network interconnection may not be favorably performed.

SUMMARY

An aspect of the present invention provides a generalized multiprotocol label switching (GMPLS) non-enabled network gateway for routing between a GMPLS enabled network and a GMPLS non-enabled network, the GMPLS non-enabled network gateway which sets a data transmission path between autonomous systems (AS) through GMPLS by interconnecting a GMPLS enabled network and a GMPLS non-enabled network and provides the GMPLS gateway in the GMPLS non-enabled network to achieve real-time routing using the GMPLS in a global network in which GMPLS enabled networks and GMPLS non-enabled networks coexist, and an operating method for the GMPLS non-enabled network gateway.

According to an aspect of the present invention, there is provided a generalized multiprotocol label switching (GMPLS) non-enabled network gateway for routing between a GMPLS enabled network and a GMPLS non-enabled network, the GMPLS non-enabled network gateway including a border gateway protocol (BGP) routing unit to exchange routing information between a first GMPLS enabled network and a third GMPLS enabled network using a BGP, and a resource reservation protocol signaling unit to search for a path to another network using the routing information and to perform inter-autonomous system (AS) signaling by including a control plane of the first GMPLS enabled network or the third GMPLS enabled network and a signaling interface applying an out-of-band method.

According to another aspect of the present invention, there is provided an operating method for a GMPLS non-enabled network gateway for routing between a GMPLS enabled network and a GMPLS non-enabled network, the operating method including exchanging routing information between a first GMPLS enabled network and a third GMPLS enabled network using a BGP, searching for a path toward another network using the routing information, performing interconnection between a pseudo path message and a pseudo reservation message, to exchange service quality information, policy information, and label information between the first GMPLS enabled network and the third GMPLS enabled network, with a network management system (NMS), and performing inter-AS signaling by including a control plane of the GMPLS enabled network and a signaling interface applying an out-of-band method.

Effect

According to embodiments of the present invention, routing may be automatically performed through interconnection between a generalized multiprotocol label switching (GMPLS) enabled network and a GMPLS non-enabled network. As a result, a global network service may be provided with a reduced expense burden for a network upgrade imposed on a communication provider and also with a reduced management burden for a distributed control of the GMPLS non-enabled network.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
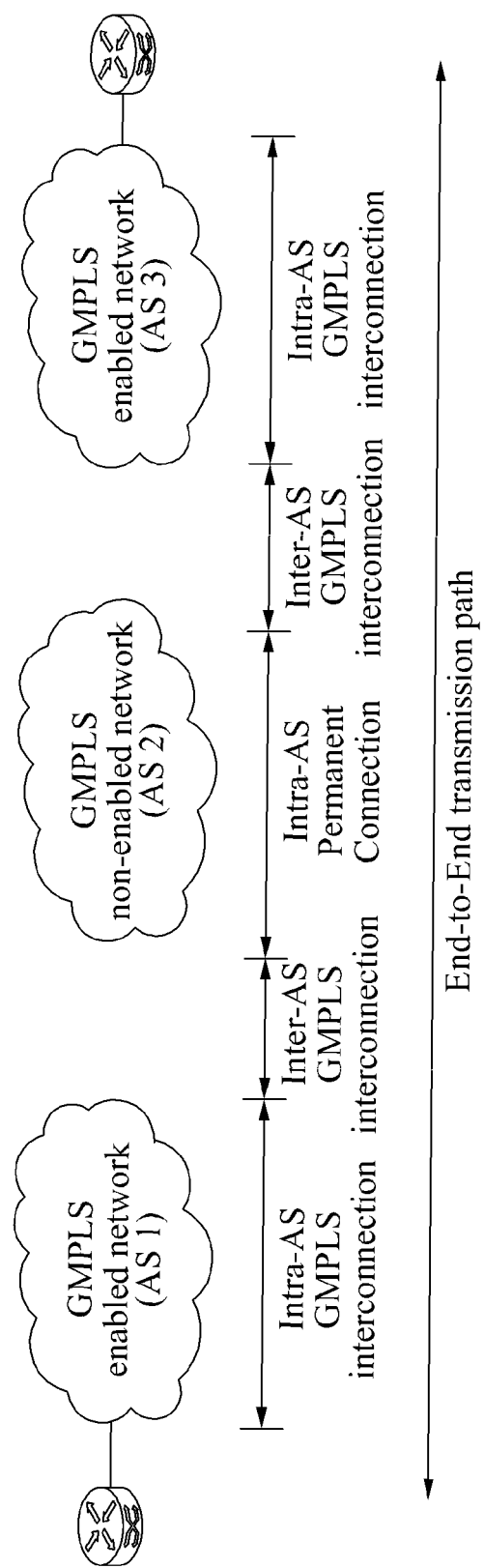
FIG. 1 is a diagram illustrating a structure and relations of a global network in which generalized multiprotocol label switching (GMPLS) enabled networks and GMPLS non-enabled networks coexist, according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

An exemplary embodiment of the present invention may provide a generalized multiprotocol label switching (GMPLS) gateway to set a path for transparent end-to-end transmission between networks by interconnecting a GMPLS non-enabled network and other GMPLS enabled networks. In addition, the GMPLS gateway according to the exemplary embodiment of the present invention may enable real-time routing in a global network in which GMPLS enabled networks and GMPLS non-enabled networks coexist.

FIG. 1 is a diagram illustrating a structure and relations of a global network in which GMPLS enabled networks and GMPLS non-enabled networks coexist, according to an embodiment of the present invention.

In the global network including the GMPLS enabled networks and the GMPLS non-enabled networks, presuming that one network constructs one autonomous system (AS), intra-AS GMPLS functions are interconnected in each AS while inter-AS GMPLS functions are interconnected among ASs. Accordingly, an end-to-end transmission path among subscribers may be provided based on the GMPLS.

Figure 2:
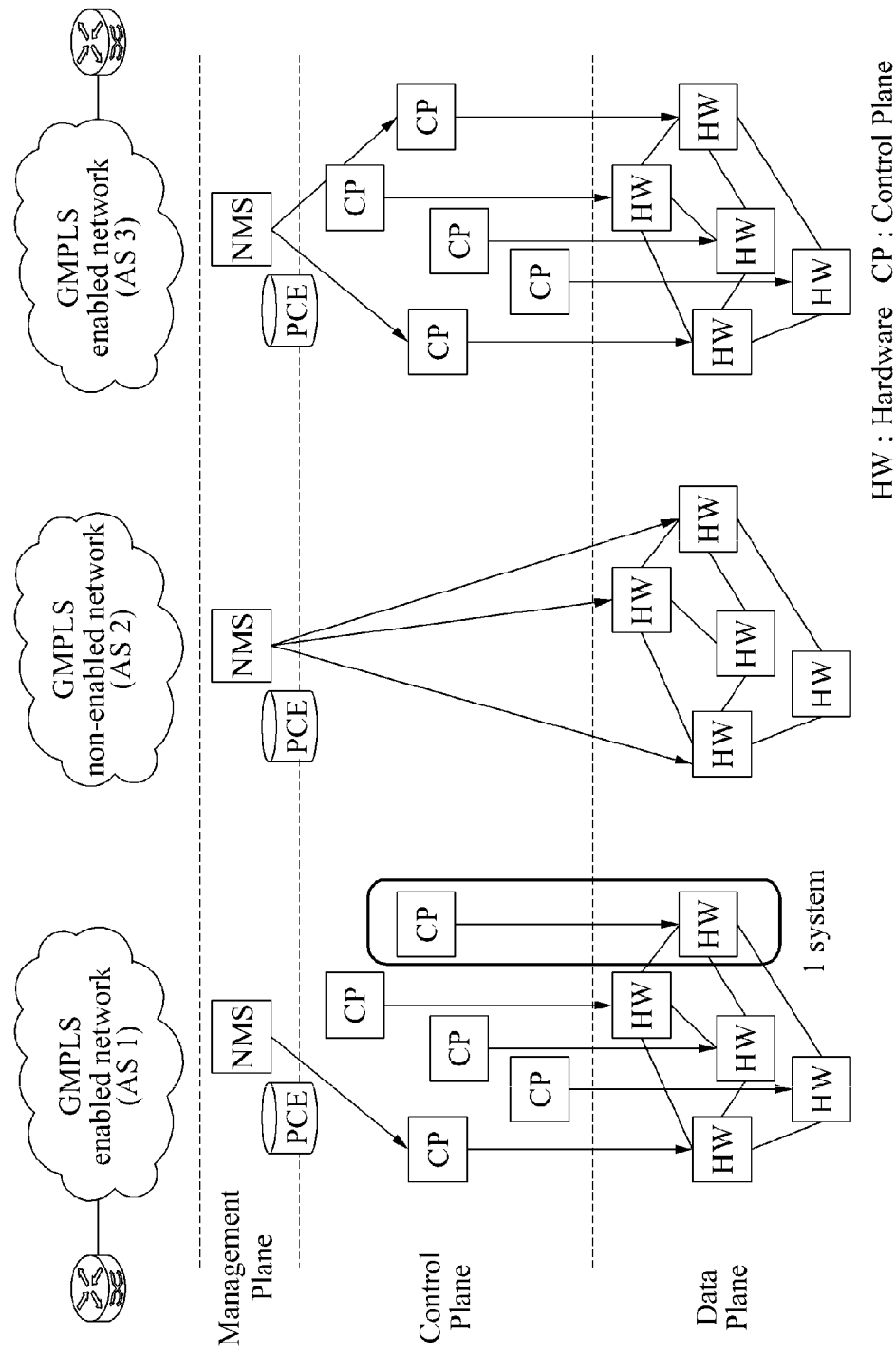
FIG. 2 is a diagram illustrating an inner structure of the GMPLS enabled network and the GMPLS non-enabled network, according to an embodiment of the present invention.

FIG. 2 is a diagram illustrating an inner structure of the GMPLS enabled network and the GMPLS non-enabled network, according to an embodiment of the present invention.

The GMPLS enabled network may include a data plane, a control plane, and a management plane. The GMPLS non-enabled network may include a data plane and a management plane, excluding a control plane.

A lowermost layer of the GMPLS enabled network includes the data plane belonging to equipment hardware that actually transmits data. An upper layer of the GMPLS enabled network includes the control plane that determines the operation of the data plane. The control plane may manage various routing protocols and signaling protocols. Also, the control plane may determine and control the operation of the data plane through communication with other equipment. An uppermost layer of the GMPLS enabled network includes the management plane that applies overall management policies regarding the equipment or the network to the control plane and the data plane.

The GMPLS enabled network includes all of the data plane, the control plane, and the management plane. Generally, the control plane and the data plane are provided together, in the form of network equipment. The GMPLS non-enabled network includes the data plane and the management plane. The network equipment of the GMPLS non-enabled network is provided as hardware for data transmission and as software for interconnection with the management plane.

Figure 3:
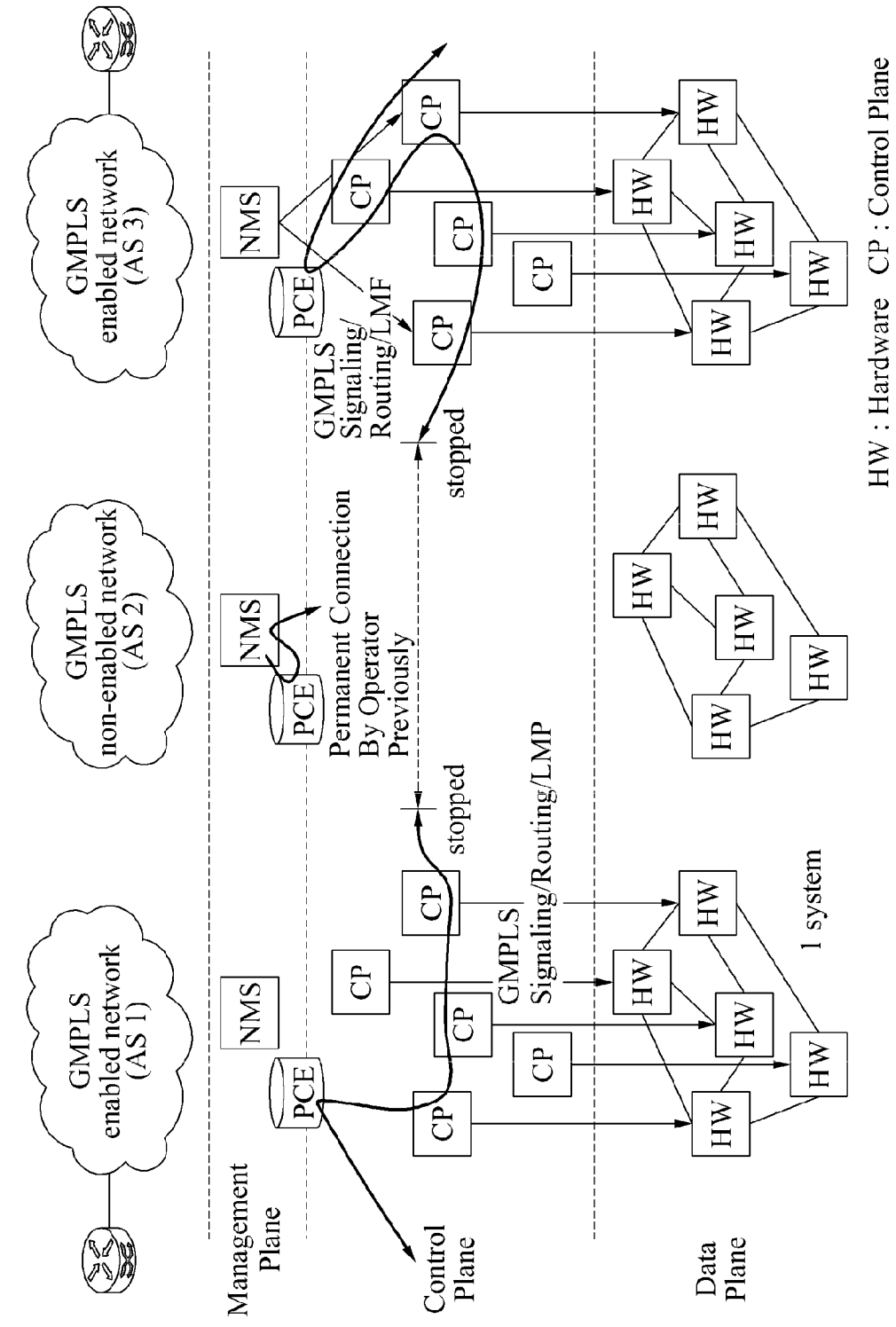
FIG. 3 is a diagram illustrating discontinuity of GMPLS signaling when the GMPLS non-enabled networks coexist during setting of a transmission path based on a GMPLS enabled network, according to an embodiment of the present invention.

FIG. 3 is a diagram illustrating discontinuity of GMPLS signaling when the GMPLS non-enabled networks coexist during setting of a transmission path based on a GMPLS enabled network, according to an embodiment of the present invention.

In the GMPLS enabled network, link search is performed by a link management protocol (LMP) while a routing protocol is operated based on searched information so that information on network topology is shared in one AS. According to path computation using a path computation engine (PCE) based on the network topology information, automatic routing by resource reservation protocol-traffic engineering (RSVP-TE) signaling may be achieved.

However, in the GMPLS non-enabled network, the LMP, the routing protocol, and the signaling protocol are not operated. Therefore, a traffic engineering data base (TEDB) of the PCE constructs information on network topology of a corresponding AS, using simple network management protocol (SNMP) information or network management system (NMS) information. When receiving a request for setting an intra-AS transmission path, the NMS may request the PCE to perform path computation for setting a demanded service, and may control the operation of the data plane corresponding to the computation result, using a command line interface (CLI) or the SNMP.

As aforementioned, the GMPLS enabled network and the GMPLS non-enabled network perform different operations for routing. Therefore, when the end-to-end path requested in real time needs to pass through the GMPLS non-enabled network, continuous GMPLS signaling is impossible. That is, in the GMPLS non-enabled network, provisioning for setting the end-to-end transmission path needs to be performed, by the management plane according to a permanent connection setup, in advance or later in an offline state.

Figure 4:
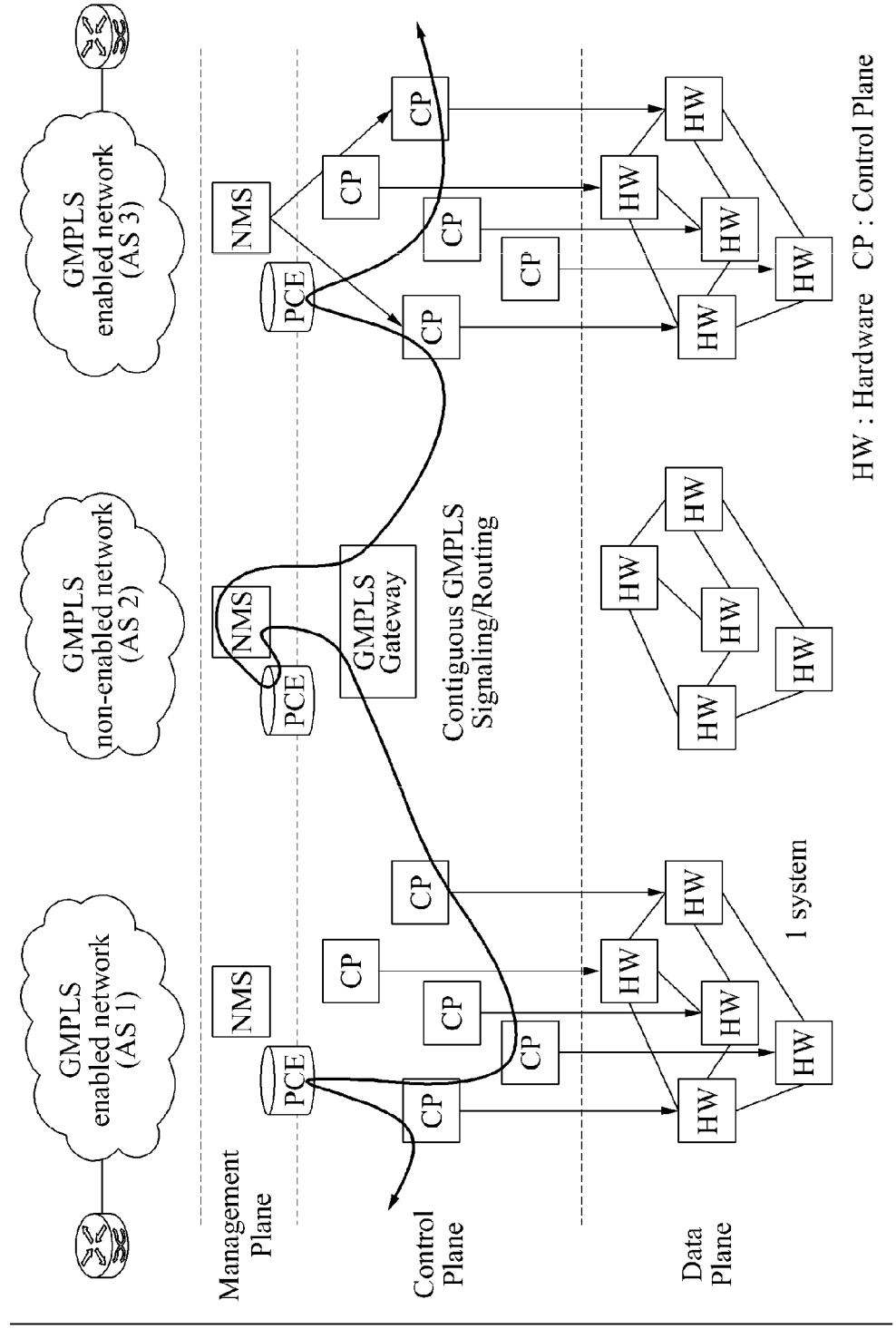
FIG. 4 is a diagram illustrating a position, a role, and a function of a GMPLS gateway supporting a GMPLS non-enabled network, according to an embodiment of the present invention.

FIG. 4 is a diagram illustrating a position, a role, and a function of a GMPLS gateway supporting a GMPLS non-enabled network, according to an embodiment of the present invention.

The GMPLS gateway may function as a control plane, separately from a network node. The GMPLS gateway may function as an inter-AS control plane with respect to the GMPLS non-enabled network. That is, the GMPLS gateway may receive signaling from a first GMPLS enabled network AS1 and enable online control of an intra-AS path is performed in interconnection with the NMS and the PCE. Also, the GMPLS gateway may perform inter-AS routing and signaling so that inter-AS label allocation is transparently set and cancelled by GMPLS signaling.

Figure 5:
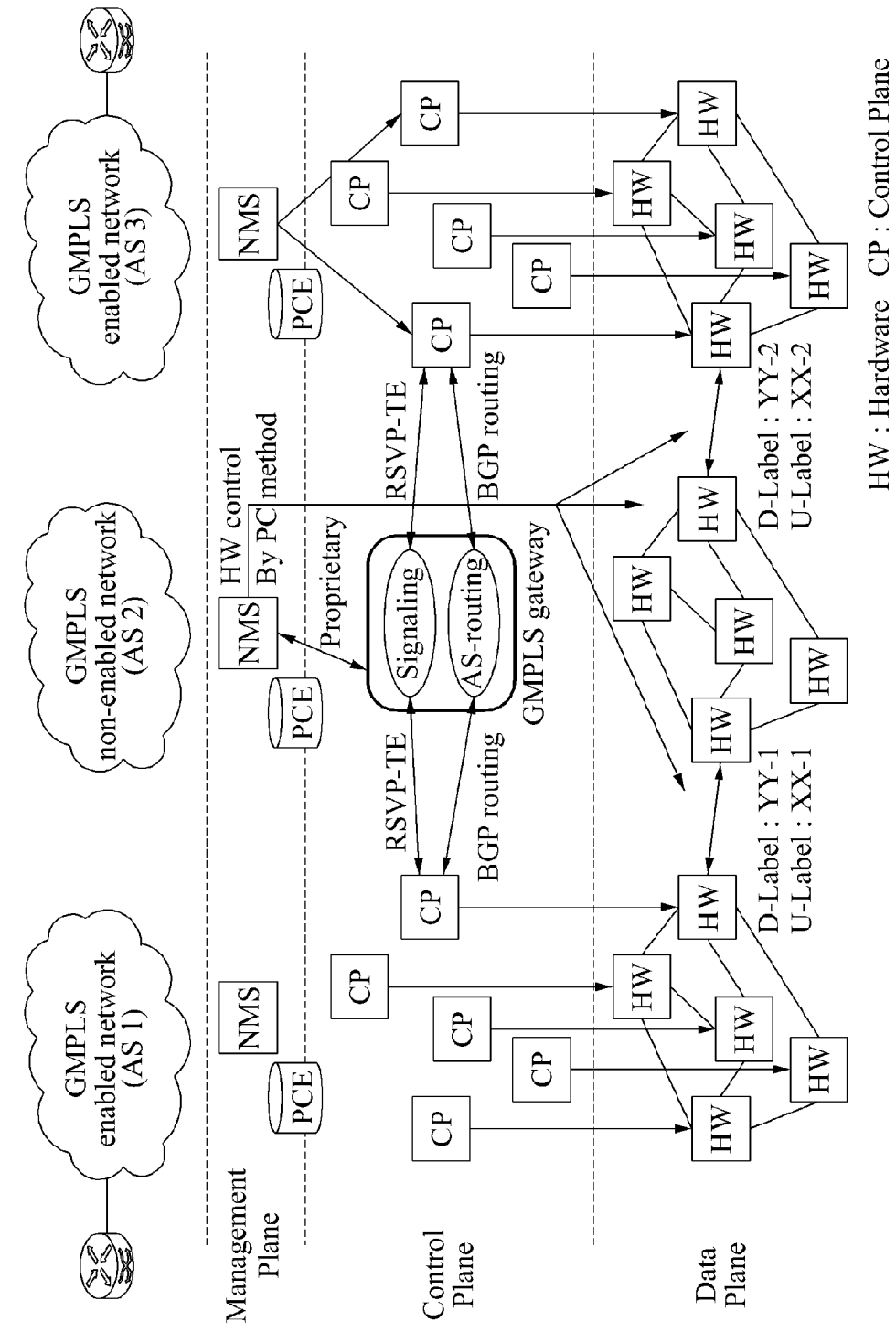
FIG. 5 is a diagram illustrating a function of a GMPLS gateway in detail, according to an embodiment of the present invention.

FIG. 5 is a diagram illustrating a function of a GMPLS gateway in detail, according to an embodiment of the present invention.

The GMPLS gateway of a GMPLS non-enabled network AS2 is interconnected with autonomous system boundary router (ASBR) GMPLS equipment of a first GMPLS enabled network AS1 and ASBR GMPLS equipment of a third GMPLS enabled network AS3 by a routing and signaling protocol. Routing with respect to the first GMPLS enabled network AS1 and the third GMPLS enabled network AS3 is performed by peer-to-peer interconnection according to a border gateway protocol (BGP) routing protocol based on policy information and manager-set routing information between networks. Therefore, the routing may be achieved without requiring interface interconnection of a data plane. Signaling interconnection with respect to the first GMPLS enabled network AS1 and the third GMPLS enabled network AS3 may be achieved when an out-of-band interface for an external control is provided.

After inter-AS routing information is exchanged through BGP routing, when an end-to-end transmission path is determined to be set from the first GMPLS enabled network AS1 to the third GMPLS enabled network AS3 passing through the GMPLS non-enabled network AS2, the GMPLS gateway of the GMPLS non-enabled network may receive a request for a transmission path passing through the GMPLS non-enabled network and extending to the third GMPLS enabled network, through RSVP-TE signaling of the first GMPLS enabled network.

An ultimate function of the GMPLS gateway is inter-AS label allocation corresponding to a demanded quality of service (QoS) and policy information and, at the same time, setting of an intra-AS online path.

The GMPLS gateway may compute of an intra-AS path with respect to the GMPLS non-enabled network AS2 using a proprietary protocol and a path computation element communication protocol (PCEP). Additionally, the GMPLS gateway may receive and transmit label information of an upstream and a downstream with respect to a direct interface with respect to the first GMPLS enabled network AS1 and the third GMPLS enabled network AS3. Since signaling is unnecessary for transmission of the intra-AS label information, the NMS may internally manage the intra-AS label information. After the signaling is completed, the NMS may receive the label information of the upstream and the downstream to be set with respect to an inter-AS interface, from the GMPLS gateway. Next, the NMS may perform intra-AS or inter-AS control of hardware of the data plane through a management interface such as the CLI or the SNMP.

Figure 6:
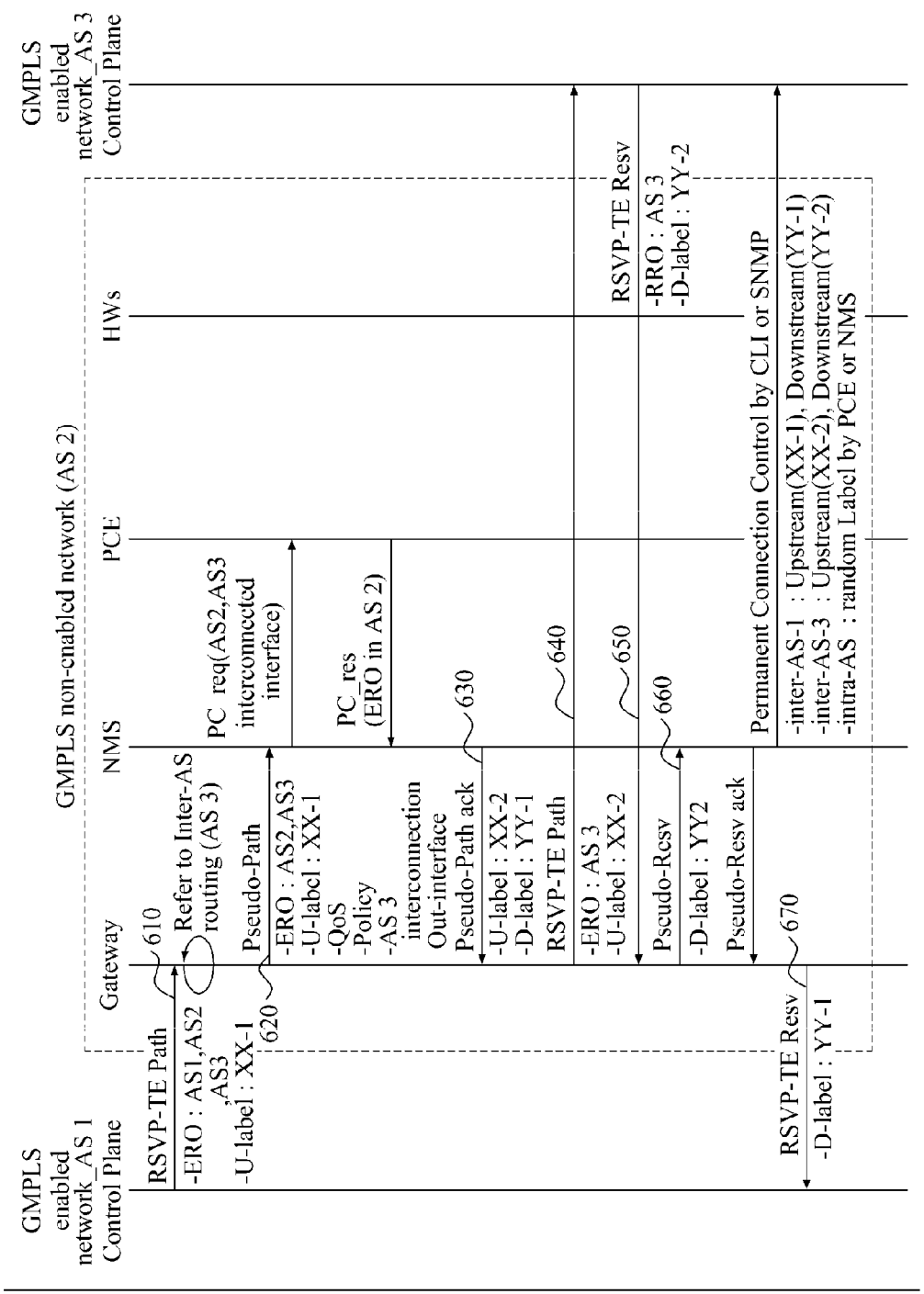
FIG. 6 is a diagram illustrating inter-autonomous system (AS) signaling flows using a GMPLS gateway according to an embodiment of the present invention.

FIG. 6 is a diagram illustrating inter-AS signaling flows in setting of an end-to-end path using a GMPLS gateway, according to an embodiment of the present invention.

Hereinafter, the inter-AS signaling flows for the GMPLS gateway located in a GMPLS non-enabled network AS2 to set a path with respect to a GMPLS enabled network will be described.

In operation 610, the GMPLS gateway may receive an RSVP-TE path message from a first GMPLS enabled network AS1. When the path is set bi-directionally, the corresponding RSVP-TE path message may include an upstream label XX-1 with respect to the first GMPLS enabled network AS1 and the GMPLS non-enabled network AS2 and also include information on the GMPLS non-enabled network AS2 and a third GMPLS enabled network AS3 that will be passed through by an end-to-end path through an explicit route object (ERO).

An ultimate function of the GMPLS gateway is inter-AS label allocation corresponding to a demanded QoS and policy information and, at the same time, setting of an intra-AS online path.

After receiving the RSVP-TE path message, the GMPLS gateway of the GMPLS non-enabled network AS2 may determine an upstream label and a downstream label with respect to the first GMPLS enabled network AS1 and also determine an upstream label and a downstream label with respect to the third GMPLS enabled network AS3, thereby communicate with control planes of the first GMPLS enabled network AS1 and the third GMPLS enabled network AS3.

For this purpose, first, the GMPLS gateway may search for interface information in the GMPLS non-enabled network AS2 interconnected with the third GMPLS enabled network AS3 from an inter-AS routing DB. Accordingly, the GMPLS gateway may determine an out-interface toward the third GMPLS enabled network AS3.

Next, in operation 620, the GMPLS gateway may transmit QoS and policy information received from the RSVP-TE path message, out-interface information searched through the inter-AS routing DB, and the upstream label XX-1 received from the first GMPLS enabled network AS1, to the NMS through a pseudo path message. The NMS may allocate a downstream label YY-1 with respect to the first GMPLS enabled network AS1. Also, the NMS may compute of an intra-AS path with respect to the GMPLS non-enabled network AS2 and allocation of an upstream label and a downstream label. In addition, the NMS may allocate an upstream label XX-2 with respect to the third GMPLS enabled network AS3.

The intra-AS label may be internally managed by the NMS and not transmitted to the GMPLS gateway. In operation 630, the GMPLS gateway may receive, from the NMS, an upstream label XX-2 with respect to an inter-AS interface with the third GMPLS enabled network AS3 and the downstream label YY-1 with respect to the first GMPLS enabled network AS1, so as to use the upstream label XX-2 and the downstream label YY-1 in a path message and a reservation message, respectively.

In operation 640, the GMPLS gateway may transmit the third GMPLS enabled network AS3 and the upstream label XX-2 received from the control plane of the NMS to the third GMPLS enabled network AS3, by loading the third GMPLS enabled network AS3 and the upstream label XX-2 on the RSVP-TE path message.

In operation 650, the GMPLS gateway may receive the RSVP-TE path message from the third GMPLS enabled network AS3. Here, the GMPLS gateway may receive a downstream label YY-2 to be allocated to an interface with respect to the GMPLS non-enabled network AS2 and the third GMPLS enabled network AS3.

In operation 660, since the downstream label YY-2 is to be applied to the inter-AS interface between the GMPLS non-enabled network AS2 and the third GMPLS enabled network AS3, the GMPLS gateway may transmit signaling success with respect to the third GMPLS enabled network AS3 and downstream label information, through a pseudo reservation message Pseudo-Resv. The NMS may apply the downstream label YY-2 to an inter-AS node with respect to the third GMPLS enabled network AS3.

In operation 670, the GMPLS gateway may transmit the downstream label YY-1 with respect to the first GMPLS enabled network AS1 obtained during processing of the pseudo path message to the control plane of the first GMPLS enabled network AS1, by loading the downstream label YY-1 on the RSVP-TE path message. Thus, the GMPLS gateway completes the inter-AS signaling.

The NMS may set the inter-AS label using the upstream label and the downstream label obtained from the GMPLS gateway. The NMS may set a label with respect to an internal network in equipment of the GMPLS non-enabled network, using an internally computed label through a management interface such as the CLI or the SNMP, thus completing routing on the data plane.

Figure 7:
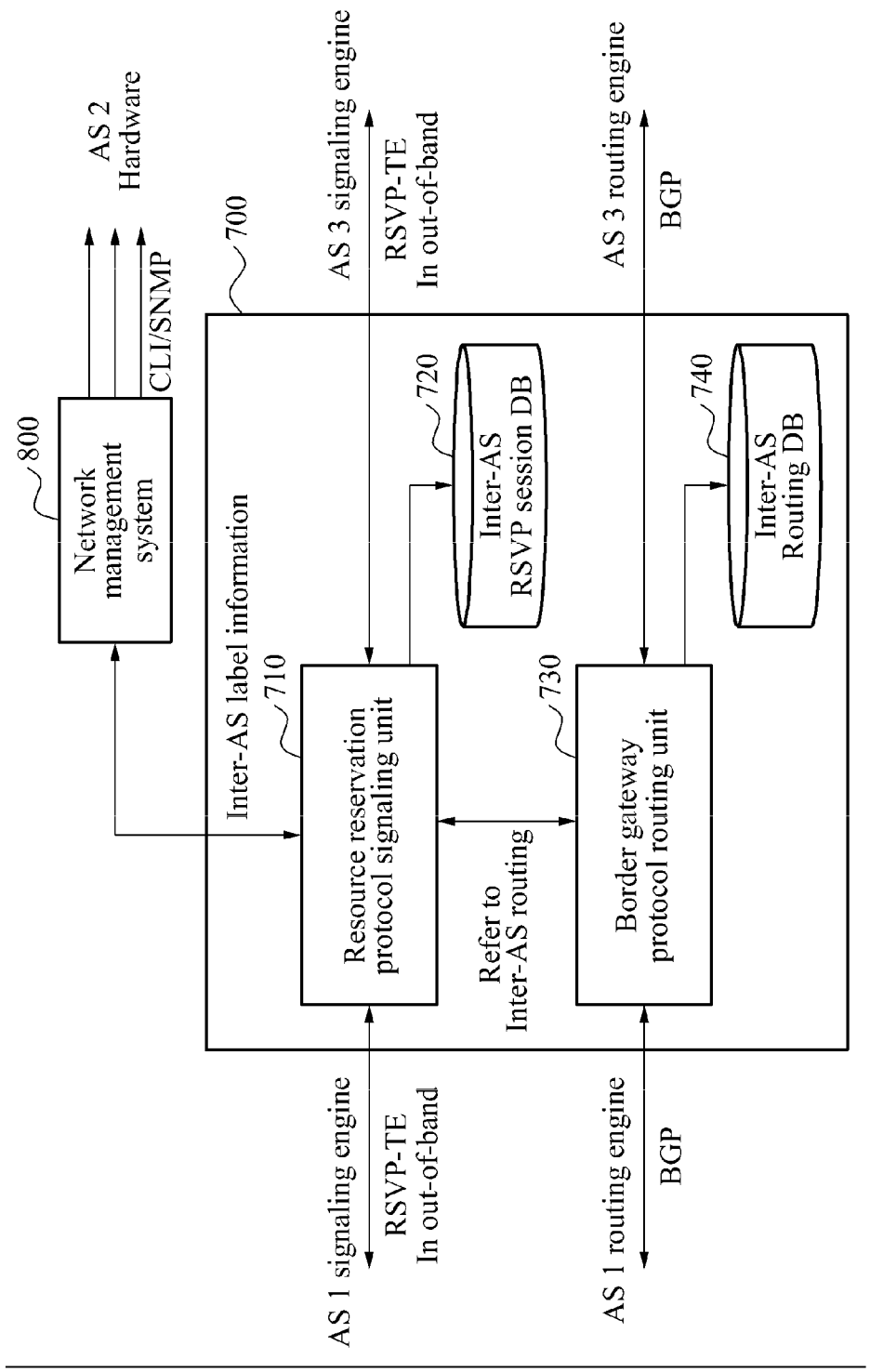
FIG. 7 is a diagram illustrating an inner structure of a GMPLS gateway and an interface, according to an embodiment of the present invention.

FIG. 7 is a diagram illustrating an inner structure of a GMPLS gateway and an interface, according to an embodiment of the present invention.

The GMPLS gateway 700 may operate as an external server separated from a network node. The GMPLS gateway 700 may include a resource reservation protocol signaling unit 710 and a BGP routing unit 730. The resource reservation protocol signaling unit 710 may include a control plane of a GMPLS enabled network and a signaling interface applying an out-of-band method. In addition, the resource reservation protocol signaling unit 710 may interconnect a pseudo path message and a pseudo reservation message for exchange of QoS, policy information, and inter-AS information with an NMS 800.

The BGP routing unit 730 may manage an inter-AS routing DB 740 by exchange of inter-AS routing information, and provide an interface for searching for a path to another network. The resource reservation protocol signaling unit 710 may construct and manage information on an inter-AS RSVP session generated through the inter-AS signaling, in an inter-AS RSVP session DB 720.

The above-described embodiments of the present invention may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A generalized multiprotocol label switching (GMPLS) non-enabled network gateway for routing between a GMPLS enabled network and a GMPLS non-enabled network, the GMPLS non-enabled network gateway comprising:
    a border gateway protocol (BGP) routing unit to exchange routing information between a first GMPLS enabled network and a third GMPLS enabled network using a BGP; and
    a resource reservation protocol signaling unit to search for a path to another network using the routing information and to perform inter-autonomous system (AS) signaling by including a control plane of the first GMPLS enabled network or the third GMPLS enabled network and a signaling interface applying an out-of-band method,
    wherein the resource reservation protocol signaling unit determines an out-interface toward the third GMPLS enabled network by searching for interface information of the GMPLS non-enabled network interconnected with the third GMPLS enabled network in an inter-AS routing database (DB) provided in the BGP routing unit,
    wherein the resource reservation protocol signaling unit transmits at least one selected from service quality information received from a resource reservation path message of the first GMPLS enabled network, policy information, out-interface information searched through the inter-AS routing DB, and an upstream label received from the first GMPLS enabled network, to a network management system (NMS) through a pseudo path message,
    wherein the NMS allocates a downstream label with respect to the first GMPLS enabled network, performs path computation for intra-AS routing in the GMPLS non-enabled network, and allocates an upstream label with respect to the third GMPLS enabled network.

2. The GMPLS non-enabled network gateway of claim 1, wherein the resource reservation protocol signaling unit manages information on an inter-AS resource reservation session generated by the inter-AS signaling using the signaling interface.

3. The GMPLS non-enabled network gateway of claim 1, wherein the resource reservation protocol signaling unit, when receiving a resource reservation path message from the first GMPLS enabled network, determines an upstream label and a downstream label with respect to the first GMPLS enabled network, determines an upstream label and a downstream label with respect to the third GMPLS enabled network, and communicates with the control planes of the first GMPLS enabled network and the third GMPLS enabled network using the determined upstream and downstream labels.

4. The GMPLS non-enabled network gateway of claim 1, wherein
    the resource reservation protocol signaling unit transmits, to the third GMPLS enabled network, the upstream label with respect to the third GMPLS enabled network allocated by the NMS by loading the upstream label on the resource reservation path message, receives a resource reservation protocol-traffic engineering (RSVP-TE) path message from the third GMPLS enabled network, the RSVP-TE path message including a downstream label to be allocated to an interface with respect to the GMPLS non-enabled network and the third GMPLS enabled network, and transmits the downstream label to the NMS through a pseudo reservation message, and
    the NMS applies the downstream label to an inter-AS node with respect to the third GMPLS enabled network.

5. The GMPLS non-enabled network gateway of claim 4, wherein the NMS sets an inter-AS label using inter-AS upstream label and downstream label obtained from the GMPLS non-enabled network gateway.

6. An operating method for a generalized multiprotocol label switching (GMPLS) non-enabled network gateway for routing between a GMPLS enabled network and a GMPLS non-enabled network, the operating method comprising:
    exchanging routing information between a first GMPLS enabled network and a third GMPLS enabled network using a border gateway protocol (BGP);
    searching for a path toward another network using the routing information;
    performing interconnection between a pseudo path message and a pseudo reservation message, to exchange service quality information, policy information, and label information between the first GMPLS enabled network and the third GMPLS enabled network, with a network management system (NMS); and
    performing inter-autonomous system (AS) signaling by including a control plane of the GMPLS enabled network and a signaling interface applying an out-of-band method,
    wherein the performing of the interconnection comprises:
    determining an upstream label and a downstream label with respect to the first GMPLS enabled network, when receiving a resource reservation path message from the first GMPLS enabled network,
    determining an upstream label and a downstream label with respect to the third GMPLS enabled network, and communicating with the control planes of the first GMPLS enabled network and the third GMPLS enabled network using the determined upstream and downstream labels,
    wherein the determining of the upstream label and the downstream label comprises:

searching for interface information of the GMPLS non-enabled network interconnected with the third GMPLS enabled network in an inter-AS routing database (DB) provided in the BGP routing unit, and determining an out-interface toward the third GMPLS enabled network as a result of the search, wherein the determining of the upstream label and the downstream label comprises:

transmitting service quality information received from a resource reservation path message of the first GMPLS enabled network, policy information, out-interface information searched through the inter-AS routing DB, and an upstream label received from the first GMPLS enabled network, to the NMS through a pseudo path message, allocating a downstream label with respect to the first GMPLS enabled network, performing path computation for intra-AS routing in the GMPLS non-enabled network and allocation of the upstream label and the downstream label, and allocating an upstream label with respect to the third GMPLS enabled network.

7. The operating method of claim 6, wherein the performing of the inter-AS signaling comprises:

managing information on an inter-AS resource reservation session generated by the inter-AS signaling using the signaling interface.

8. The operating method of claim 6, wherein the allocating of the upstream label with respect to the third GMPLS enabled network comprises:

transmitting the upstream label with respect to the third GMPLS enabled network allocated by the NMS by loading the upstream label on the resource reservation path message;

receiving a resource reservation protocol-traffic engineering (RSVP-TE) path message from the third GMPLS enabled network, the RSVP-TE path message including a downstream label to be allocated to an interface with respect to the GMPLS non-enabled network and the third GMPLS enabled network;

transmitting the downstream label to the NMS through a pseudo reservation message; and applying the downstream label to an inter-AS node with respect to the third GMPLS enabled network.

9. The operating method of claim 8, wherein the applying of the downstream label by the NMS comprises:

setting an inter-AS label using inter-AS upstream label and downstream label obtained from the GMPLS non-enabled network gateway.

\* \* \* \* \*